United States Patent
Kim et al.

(10) Patent No.: US 8,310,567 B2
(45) Date of Patent: Nov. 13, 2012

(54) METHODS OF MODELING AN INTEGRATED NOISE IN AN IMAGE SENSOR AND METHODS OF REDUCING NOISE USING THE SAME

(75) Inventors: Hyoung Joon Kim, Suwon-si (KR); Whoi Yul Kim, Seoul (KR); Jin Aeon Lee, Suwon-si (KR); Yeul Min Baek, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 314 days.

(21) Appl. No.: 12/770,828

(22) Filed: Apr. 30, 2010

(65) Prior Publication Data

US 2011/0102647 A1 May 5, 2011

(30) Foreign Application Priority Data

Nov. 3, 2009 (KR) .................. 10-2009-0105681

(51) Int. Cl.
*H04N 9/64* (2006.01)
*G06K 9/40* (2006.01)
(52) U.S. Cl. ............ 348/242; 348/261; 348/275
(58) Field of Classification Search .......... 348/241, 348/242, 243; 382/274, 275, 261
See application file for complete search history.

(56) References Cited

U.S. PATENT DOCUMENTS

| | | | | |
|---|---|---|---|---|
| 7,280,141 B1 * | 10/2007 | Frank et al. | ............ | 348/243 |
| 7,480,365 B1 * | 1/2009 | Topfer et al. | ............ | 378/108 |
| 7,643,699 B2 * | 1/2010 | Lim et al. | ............ | 382/275 |
| 7,672,529 B2 * | 3/2010 | Chiu | ............ | 382/261 |
| 8,023,013 B1 * | 9/2011 | Linzer et al. | ............ | 348/247 |
| 2004/0081344 A1 * | 4/2004 | Allouche | ............ | 382/132 |
| 2006/0066736 A1 * | 3/2006 | Tsuruoka | ............ | 348/241 |
| 2008/0031537 A1 * | 2/2008 | Gutkowicz-Krusin et al. | ............ | 382/254 |
| 2008/0239094 A1 * | 10/2008 | Baqai et al. | ............ | 348/223.1 |
| 2008/0273793 A1 * | 11/2008 | Oishi | ............ | 382/167 |
| 2009/0167901 A1 * | 7/2009 | Aragaki | ............ | 348/241 |
| 2009/0309998 A1 * | 12/2009 | Grosvenor et al. | ............ | 348/241 |
| 2010/0020850 A1 * | 1/2010 | Navarro Rodero et al. | ............ | 375/130 |
| 2010/0182461 A1 * | 7/2010 | On | ............ | 348/241 |
| 2010/0194933 A1 * | 8/2010 | Sasaki | ............ | 348/241 |
| 2010/0253811 A1 * | 10/2010 | On | ............ | 348/241 |
| 2010/0303367 A1 * | 12/2010 | Matsushita et al. | ............ | 382/218 |

(Continued)

FOREIGN PATENT DOCUMENTS

JP 2006-041687 2/2006

(Continued)

OTHER PUBLICATIONS

Baek et al.; "Integrated Noise Modeling for Image Sensor Using Bayer Domain Images"; May 2009; MIRAGE '09 Proceedings of the 4th International Conference on Computer Vision/Computer Graphics Collaboration Techniques; pp. 413-424.*

*Primary Examiner* — John Villecco
(74) *Attorney, Agent, or Firm* — Volentine & Whitt, PLLC (57) ABSTRACT

A method is for processing a Bayer domain signal of an image sensor to model an integrated noise in the image sensor. The method includes receiving the Bayer domain signal of the image signal, setting a plurality of noise models using the Bayer domain signal, and determining an integrated noise level in the image sensor based on the plurality of noise models. The noise models include a dark-current noise model, a shot noise model and a fixed-pattern noise model.

20 Claims, 9 Drawing Sheets

U.S. PATENT DOCUMENTS

2012/0033109 A1 * 2/2012 Tsuruoka ................ 348/242

FOREIGN PATENT DOCUMENTS

| JP | 2008252911 A | * | 10/2008 |
| JP | 1020090020917 | | 2/2009 |
| JP | 2009-105966 | | 5/2009 |
| JP | 2011101359 A | * | 5/2011 |
| WO | 2006/043563 | | 4/2006 |

* cited by examiner

METHODS OF MODELING AN INTEGRATED NOISE IN AN IMAGE SENSOR AND METHODS OF REDUCING NOISE USING THE SAME

CROSS-REFERENCE TO RELATED APPLICATION(S)

A claim of priority under 35 USC §119 is made to Korean Patent Application No. 10-2009-0105681, filed Nov. 3, 2009, in the Korean Intellectual Property Office (KIPO), the contents of which are incorporated herein by reference in their entirety.

BACKGROUND

Example embodiments relate to an image sensor, and more particularly, to methods of modeling integrated noise in an image sensor and to methods of reducing noise in an image sensor using integrated noise modeling.

Images captured by an image sensor include noise of various types, and the adverse impact of the noise can increase as images sensors are made more highly integrated to reduce the size of portable devices such as digital cameras, camera phones, and so on. As a result, techniques for reducing image sensor noise have become more important with device miniaturization.

In most conventional techniques, the noise caused in the image sensor is assumed as an Additive White Gaussian Noise (AWGN) having a fixed deviation with respect to brightness or intensity of the captured image. A captured image includes noise depending on its intensity, and the conventional techniques adopting the AWGN assumption are limited in removing noise from the captured image. Other conventional techniques based on noise modeling have not been sufficiently developed, such that only a shot noise is considered into the noise modeling. As such, conventional techniques cannot sufficiently reflect various noise types, and thus image quality remains degraded even after the captured image is processed to remove the noise.

SUMMARY

According to some example embodiments, a method is provided for processing a Bayer domain signal of an image signal to model an integrated noise in the image sensor. The method includes receiving the Bayer domain signal of the image signal, setting a plurality of noise models using the Bayer domain signal, and determining an integrated noise level in the image sensor based on the plurality of noise models. The noise models include a dark-current noise model, a shot noise model and a fixed-pattern noise model.

The integrated noise level may depend on an exposure time of the image sensor and a pixel data to be processed, where the pixel data are provided from the image sensor in the Bayer domain.

At least one of the dark-current noise model, the shot noise model and the fixed-pattern noise model may be set with respect to each color of the Bayer domain.

At least one of the dark-current noise model, the shot noise model and the fixed-pattern noise model may be set with respect to each gain of the image sensor.

The dark-current noise model may correspond to a standard deviation of a dark-current noise, and the standard deviation of the dark-current noise may be set as a linear function depending on an exposure time of the image sensor.

The shot noise model may correspond to a standard deviation of a shot noise, and the standard deviation of the shot noise may be set as a linear function depending on a pixel data to be processed.

The fixed-pattern noise model may correspond to a standard deviation of a fixed-pattern noise, and the standard deviation of the fixed-pattern noise may be set as a linear function depending on a pixel data to be processed.

A dark-current bias may be set using the Bayer domain signal provided from the image sensor, where the dark-current bias corresponds to an average value of a dark-current noise.

The integrated noise level may be determined based on the dark-current noise model when a pixel data to be processed is smaller than the dark-current bias, and the integrated noise level may be determined based on the shot noise model and the fixed-pattern noise model when the pixel data to be processed is equal to or greater than the dark-current bias.

The integrated noise level may be determined as $SINT(L, T) = SD(T)$ when a pixel data to be processed is smaller than the dark-current bias, and the integrated noise level may be determined as $SINT(L,T) = [SS(L)^2 + SF(L)^2]^{1/2}$ when the pixel data to be processed is equal to or greater than the dark-current bias, where L is the pixel data to be processed, T is an exposure time of the image sensor, SINT is the integrated noise level, SD is a standard deviation of a dark-current noise, SS is a standard deviation of a shot noise and SF is a standard deviation of a fixed-pattern noise.

Also according to some example embodiments, a method is provided for reducing noise in an image sensor. The method includes setting a plurality of noise models using a Bayer domain signal provided from the image sensor, determining an integrated noise level based on the plurality of noise models, and filtering frame data based on the integrated noise level, the frame data including a plurality of pixel data provided from the image sensor in a Bayer domain. The noise models include a dark-current noise model, a shot noise model and a fixed-pattern noise model.

The dark-current noise model may correspond to a standard deviation of a dark-current noise, and the standard deviation of the dark-current noise may be set as a linear function depending on an exposure time of the image sensor, the shot noise model may correspond to a standard deviation of a shot noise and the standard deviation of the shot noise may be set as a linear function depending on the pixel data to be processed, and the fixed-pattern noise model may correspond to a standard deviation of a fixed-pattern noise and the standard deviation of the fixed-pattern noise may be set as a linear function depending on the pixel data to be processed.

The plurality of noise models may be set by setting each of the noise models as each of functions, respectively, and storing coefficients of the functions as a lookup table in a storage device of the image sensor, where the coefficients are set with respect to each color of Bayer domain and each gain of the image sensor.

The integrated noise level may be determined by extracting the coefficients from the lookup table, where the extracted coefficients correspond to the gain of the image sensor and the color of the pixel data to be processed and calculating the integrated noise level based on an exposure time of the image sensor, the pixel data to be processed and the extracted coefficients.

A dark-current bias may be set using the Bayer domain signal provided from the image sensor, where the dark-current bias corresponds to an average value of a dark-current noise.

The integrated noise level may be determined based on the dark-current noise model when the pixel data to be processed is smaller than the dark-current bias, and the integrated noise level may be determined based on the shot noise model and the fixed-pattern noise model when the pixel data to be processed is equal to or greater than the dark-current bias.

The integrated noise level may be determined as $SINT(L,T)=SD(T)$ when the pixel data to be processed is smaller than the dark-current bias, and the integrated noise level may be determined as $SINT(L,T)=[SS(L)^2+SF(L)^2]^{1/2}$ when the pixel data to be processed is equal to or greater than the dark-current bias, where L is the pixel data to be processed, T is an exposure time of the image sensor, SINT is the integrated noise level, SD is a standard deviation of a dark-current noise, SS is a standard deviation of a shot noise and SF is a standard deviation of a fixed-pattern noise.

The frame data may be filtered based on a following equation, $$FLc = \frac{\sum_{i,j} Sij(Pc)Rij(Lc, SINT)Lij}{\sum_{i,j} Sij(Pc)Rij(Lc, SINT)},$$

where SINT is the integrated noise level, Lc is the pixel data to be processed, Pc is a position of the pixel data to be processed, FLc is a filtered pixel data, Lij is each neighboring pixel data, Sij is a first weight function depending on the position of the pixel data to be processed and a position of each neighboring pixel data, and Rij is a second weight function depending on the pixel data to be processed and each neighboring pixel data.

The second weight function may be calculated based on a following equation, $$Rij = \exp\left\{-\frac{1}{2}\left(\frac{|Lc - Lij|}{SINT(Lc, T)}\right)^2\right\},$$

where T is an exposure time of the image sensor.

The frame data may be filtered with respect to each color of the Bayer domain, and each neighboring pixel data may pertain to the same color as the pixel data to be processed.

BRIEF DESCRIPTION OF THE DRAWINGS

Illustrative, non-limiting example embodiments will be more clearly understood from the detailed description that follows in conjunction with the accompanying drawings.

DETAILED DESCRIPTION OF THE EMBODIMENTS

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an image capturing device according to example embodiments.

Figure 1:
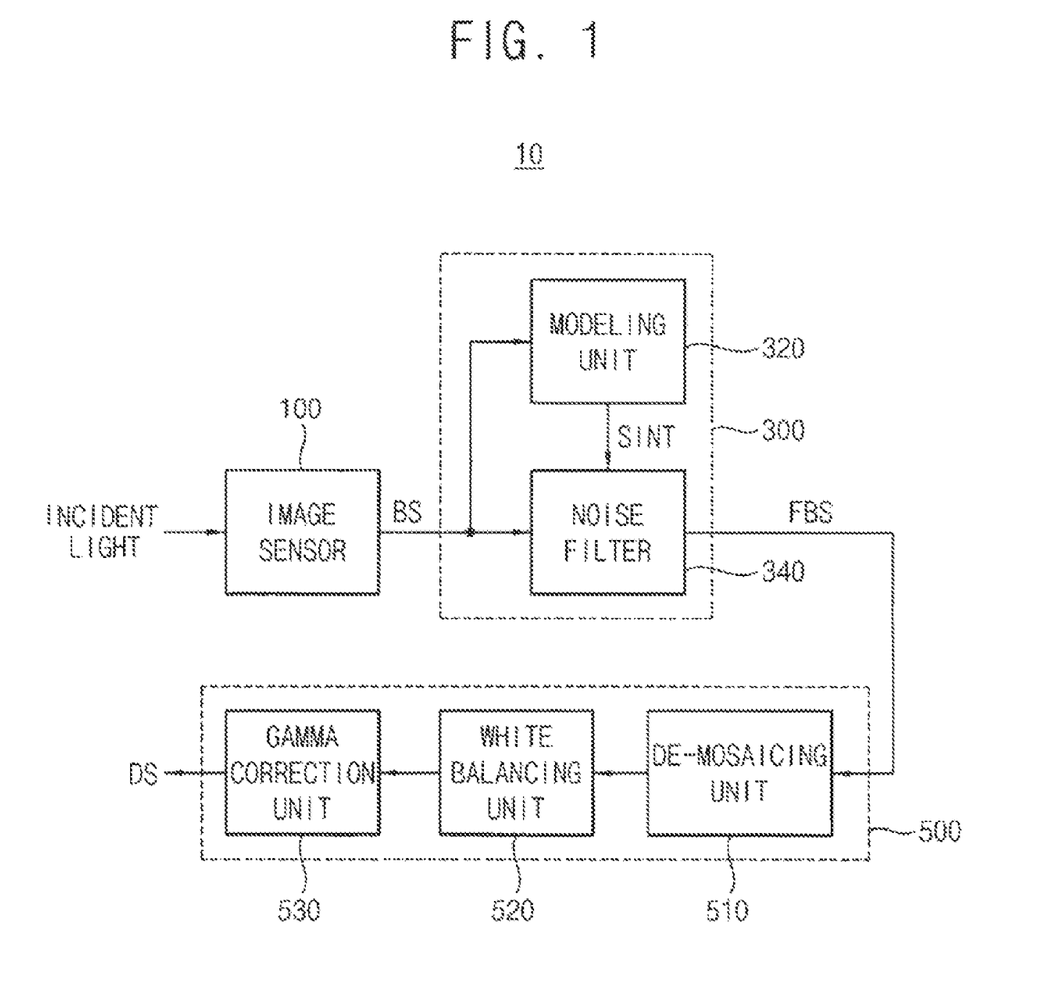
FIG. 1 is a block diagram illustrating an image capturing device according to example embodiments.

Referring to FIG. 1, an image capturing device 10 of this example includes an image sensor 100, a noise reduction circuit 300 and a post-processing circuit 500.

The image sensor 100 captures images by sensing incident light and converting the sensed light into electrical signals corresponding to a colored filter array (CFA) of the image sensor. In the examples that follow, the CFA is a Bayer filter mosaic as represented in later-described FIG. 12, and the image sensor 100 outputs a Bayer domain signal BS corresponding to the Bayer filter mosaic. The image sensor 100 may, for example, be a Complementary Metal-Oxide Semiconductor (CMOS) image sensor or a Charge-Coupled Device (CCD) image sensor.

The noise reduction circuit 300 of this example embodiment includes a modeling unit 320 and a noise filter 430. The modeling unit 320 sets a plurality of noise models including a dark-current noise model, a shot noise model and a fixed-pattern noise model, using the Bayer domain signal BS provided from the image sensor 100. In addition, the modeling unit 320 determines an integrated noise level SINT based on the plurality of noise models. The noise filter 340 filters the Bayer domain signal BS based on the integrated noise level SINT to output a filtered Bayer domain signal FBS. The Bayer domain signal BS processed by the noise filter 340 may, for example, be frame data including a plurality of pixel data provided from the image sensor 100 in the Bayer domain.

The post-processing circuit 500 of this example embodiment includes a de-mosaicing unit 510, a white balancing unit 520 and a gamma correlation unit 530. The post-processing circuit 500 receives the filtered Bayer domain signal FBS, and further processes the filtered Bayer domain signal FBS, through the de-mosaicing unit 510, the white balancing unit 520 and the gamma correlation unit 530, to output an image domain signal DS. The image domain signal DS is a signal such as an RGB data signal that is suitable as an input of a display device.

In conventional techniques, the noise characteristic of the image sensor is modeled typically based on the image domain signal resulting from the post-processing. In this case, noise of the Bayer domain signal from the image sensor are distorted to exhibit spatial correlation and non-linear characteristics, through the post-processing such as de-mosaicing, white balancing, gamma correction, etc. As a result, noise cannot be effectively removed, since precise noise characteristics are difficult to obtain when noise modeling is performed based on the image domain signal DS after the post-processing. In contrast, the noise reduction circuit 300 of the example embodiment performs noise modeling based on the Bayer domain signal BS before the post-processing to obtain relatively precise noise characteristics, and thus noise in the image captured by the image sensor 100 may be effectively reduced by the noise filter 340.

Furthermore, in conventional techniques, the obtained noise model must be upgraded whenever the image sensor 100 captures new images. In this case, the amount of calculation and the required memory capacity increases, thereby increasing power consumption and circuit size, while at the same time decreasing an operational speed of the circuits. As a result, conventional noise modeling and related devices have relatively low adaptability to portable devices that requires smaller circuit sizes and low power consumption, yet must maintain higher operational speeds.

In the noise reduction circuit 300 according to example embodiments, is it not necessary frequently upgrade the obtained noise model, and values representing the noise model may be stored in a small capacity memory device in the form of a lookup table. The amount of calculation for noise filtering may be reduced using the stored values, and thus the noise reduction circuit 300 may perform noise filtering in an efficient manner.

Figure 2:
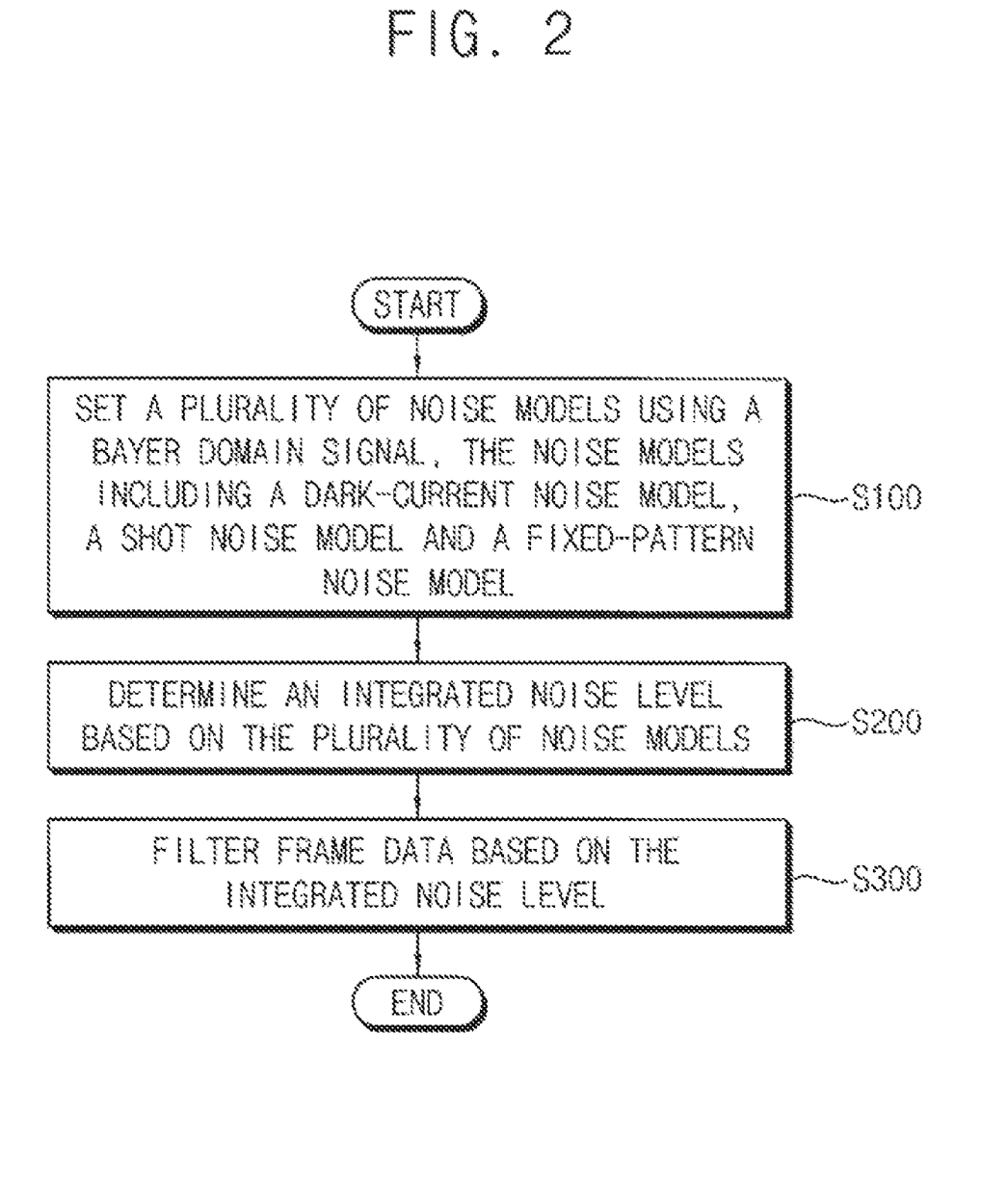
FIG. 2 is a flow chart illustrating a method of reducing noise in an image sensor according to example embodiments.

FIG. 2 is a flow chart illustrating a method of reducing noise in an image sensor according to example embodiments.

Referring to FIG. 2, a plurality of noise models are set using a Bayer domain signal provided from the image sensor (step S100). In the example of this embodiment, the noise models include a dark-current noise model, a shot noise model and a fixed-pattern noise model. The models may be set as respective functions, and coefficients of each function may be obtained with respect to each color of the Bayer domain and each gain of the image sensor. Examples of setting each noise model will be further described with reference to FIGS. 3 through 8. The coefficients may, for example, be stored in a storage device as a lookup table, and noise filtering may be performed by extracting the corresponding coefficients from the lookup table.

An integrated noise level is determined based on the plurality of noise models (Step S200). The integrated noise level may depend on an exposure time of an image sensor and each pixel data to be processed. At least one of the dark-current noise model, the shot noise model and the fixed-pattern noise model may be set with respect to each color of Bayer domain. In this case, the integrated noise level may be determined depending on the respective color of Bayer domain.

Once the integrated noise level is determined, frame data is filtered based on the integrated noise level (S300), where the frame data include a plurality of pixel data provided from the image sensor in the Bayer domain. As will be described later, pixel-position-based weight values and/or pixel-data-based weight values may be applied to noise filtering. The integrated noise level may be used to calculate the pixel-data-based weight values.

The integrated noise modeling according to example embodiments provide a noise model that reflects a dark-current noise, a shot noise and a fixed-pattern noise, and thus precise noise processing or filtering may be performed in a wide range from a lower brightness image to a higher brightness image.

Figure 3:
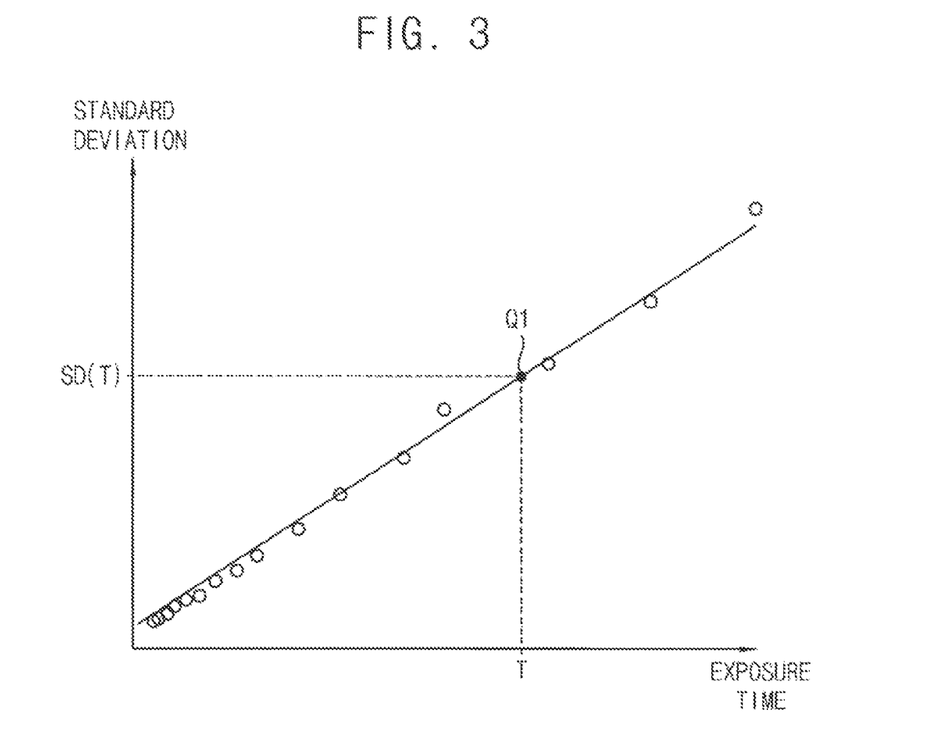
FIG. 3 is a diagram illustrating an example of a dark-current model for integrated noise modeling according to an example embodiment.
Figure 4:
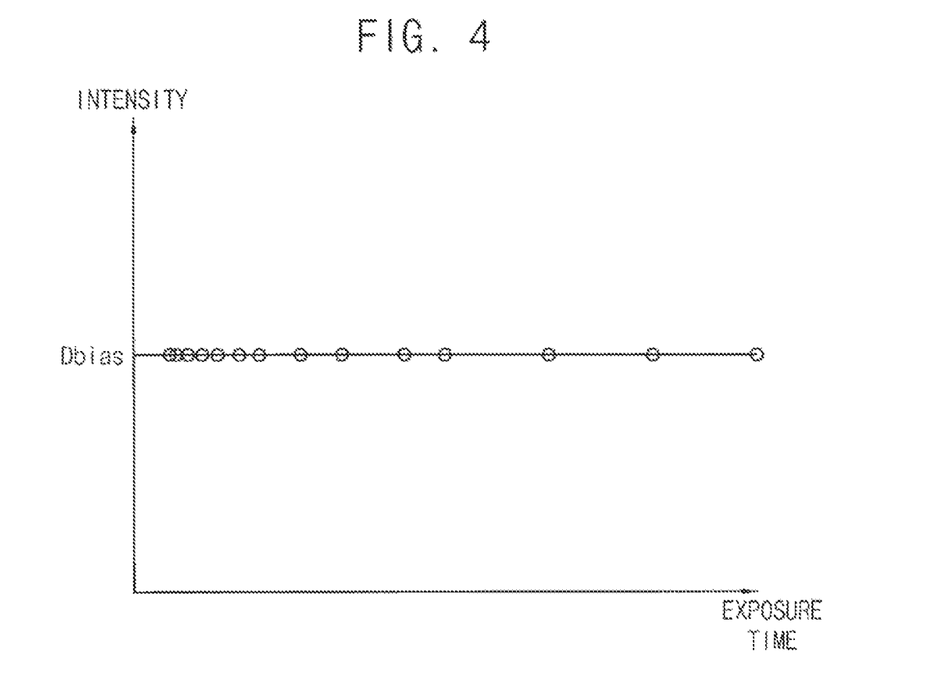
FIG. 4 is a diagram illustrating an example of a dark-current bias for integrated noise modeling according to an example embodiment.

FIG. 3 is a diagram illustrating an example of a dark-current model for integrated noise modeling according to an example embodiment, and FIG. 4 is a diagram illustrating an example of a dark-current bias for integrated noise modeling according to an example embodiment.

The dark-current noise in the captured image is caused by a saturated current in a semiconductor substrate in which pixels of an image sensor are formed. If brightness or intensity of the captured image is zero, an ideal image sensor is expected to output a zero signal. However, actual image sensors output a non-zero signal due to the dark current therein.

The dark-current noise model may be regarded as nD~N(Dbias, $SD^2(T)$), that is, a Gaussian noise that has an average value of Dbias and a variance $SD^2(T)$ varying over an exposure time T of the image sensor. For example, the standard deviation SD may be obtained by capturing dark frame images with respect to various exposure times. The dark frame images may be captured by closing a lens cap of a camera in a dark room. Each frame image is composed of a plurality of pixel data. With respect to each dark frame image, an average value and a standard deviation of each set of pixel data are calculated. The small circles of FIG. 3 represent samples of the calculated standard deviations according to several exposure times, and the small circles of FIG. 4 represent the corresponding samples of the calculated average values.

Referring to FIG. 3, the standard deviation of the dark-current noise may be set as a linear function depending on the exposure time. The straight line of FIG. 3 represents the linear function, and the linear function may be obtained by fitting the straight line to the samples of the standard deviations, for example, through least square regression. The arbitrary point Q1 on the straight line represents the standard deviation of the dark-current noise according to the exposure the time T.

As such, the dark-current noise model may correspond to the standard deviation SD of the dark-current noise, and the standard deviation SD of the dark-current noise may be set as the linear function SD(T) depending on the exposure time T of the image sensor as shown in Expression 1.

$$SD(T)=c1*T+c2 \qquad \text{Expression 1}$$

Figure 12:
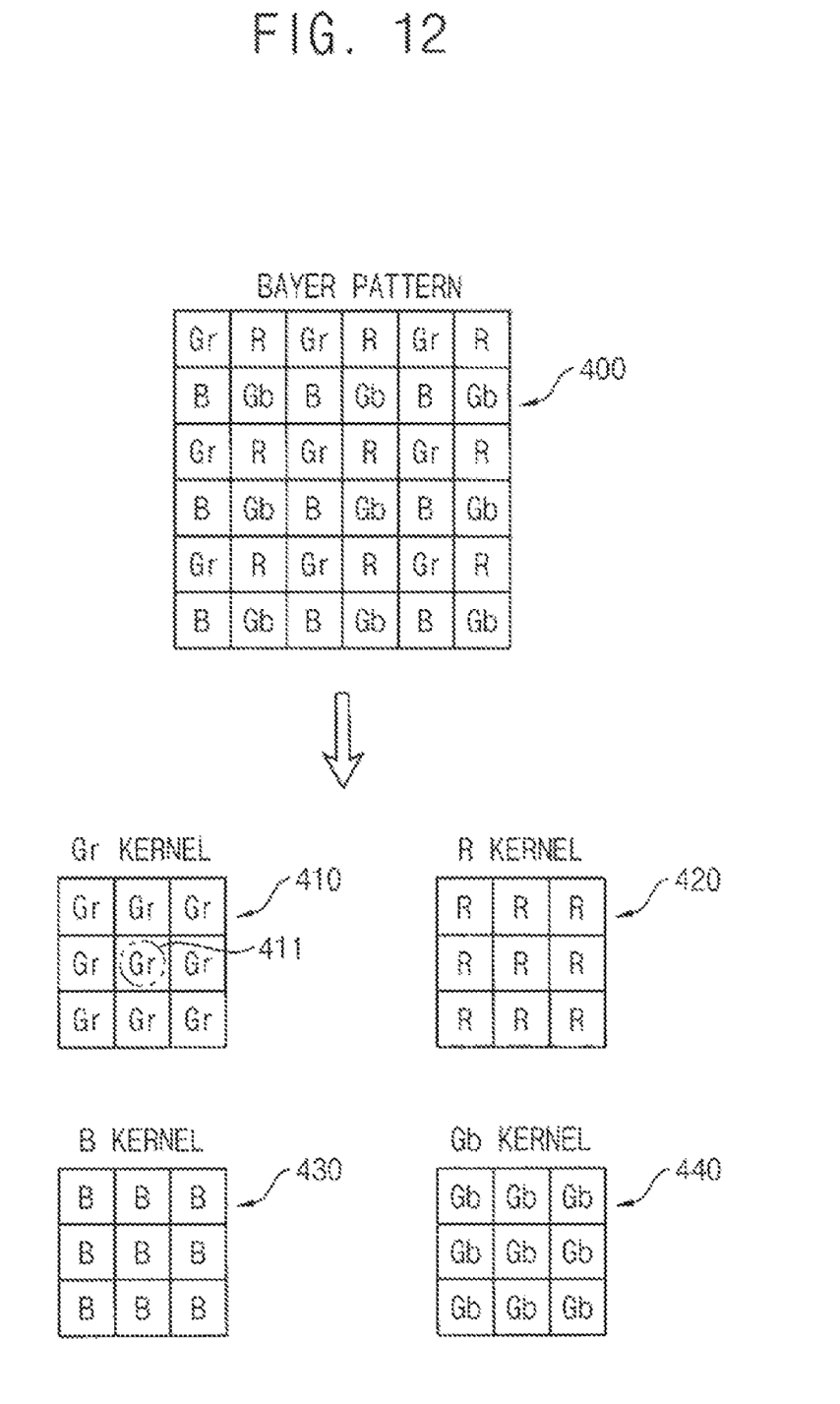
FIG. 12 is a diagram illustrating an example of a filter kernel for reducing noise in an image sensor.

As a result, the dark-current noise model may be set by obtaining the coefficients c1 and c2 in Expression 1. The dark-current noise may be varied depending on a gain or a sensitivity of the image sensor, and thus the coefficients c1 and c2 may be set with respect to each gain of the image sensor. Furthermore, the dark-current noise may be varied depending on a color of the Bayer domain, and thus the coefficients c1 and c2 may be set with respect to each color of the Bayer domain. For example, if the pattern and the color kernel are similar to those as illustrated in FIG. 12, four different sets of coefficients c1 and c2 may be set according to four colors R, Gr, B and Gb, respectively.

Referring to FIG. 4, the average values of the pixel data of the respective dark frames are substantially constant regardless of the exposure time. The dark-current bias Dbias corresponding to the average value of the dark-current noise may be used in determining the integrated noise level, as will be described in further detail later herein.

Figure 5:
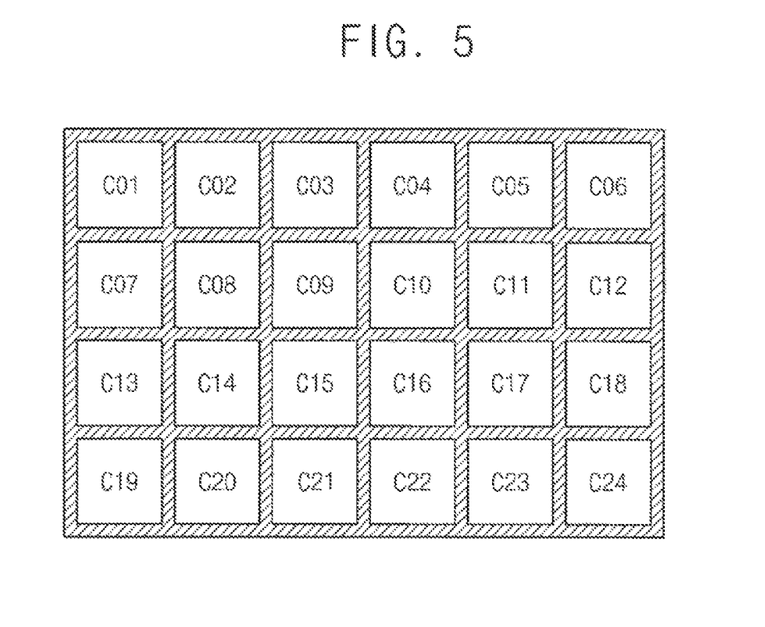
FIG. 5 is a diagram illustrating an example of a color checker.
Figure 6:
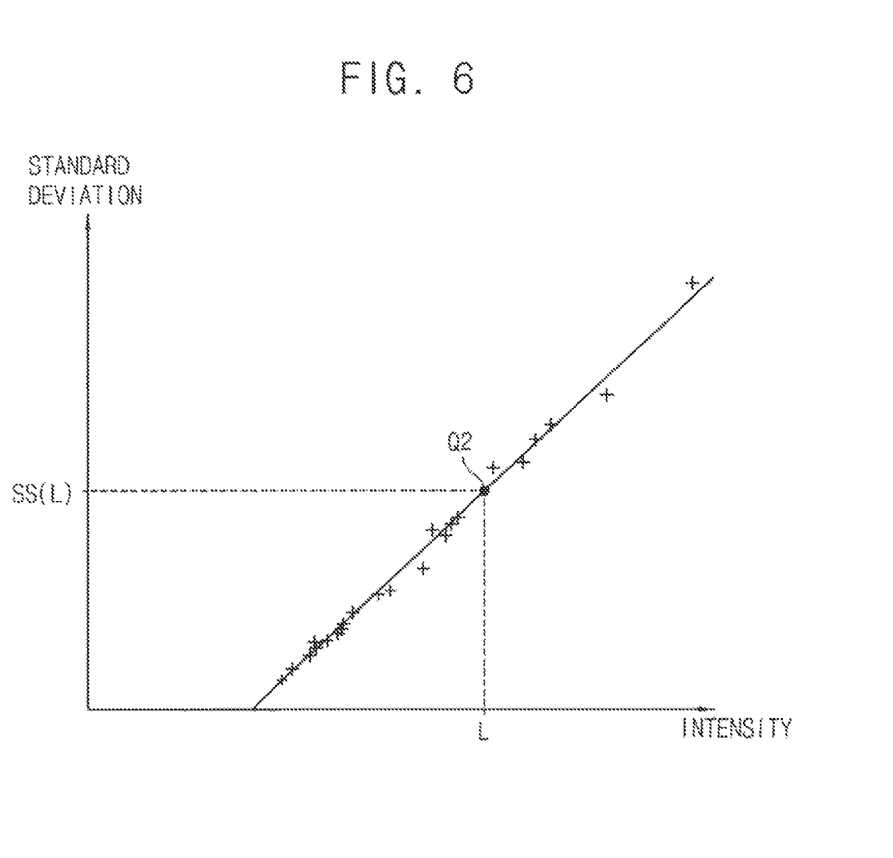
FIG. 6 is a diagram illustrating an example of a shot noise model for integrated noise modeling according to an example embodiment.

FIG. 5 is a diagram illustrating an example of a color checker, and FIG. 6 is a diagram illustrating an example of a shot noise model for integrated noise modeling according to an example embodiment.

The shot noise in the captured image is caused by intrinsic irregularity or fluctuation of photons incident on an image sensor. The shot noise model may be regarded as nS~N(0, $SS^2(L)$), that is, a Gaussian noise that has an average value of zero and a variance $SS^2(L)$ varying over the pixel data L. For example, the standard deviation SS of the shot noise may be obtained by capturing an image of a color checker as illustrated in FIG. 5. The color checker may be an arbitrary commercial product, and FIG. 5 illustrates an example color checker including twenty four patches of different colors C01~C24. With respect to each image of the color patches in the color checker, an average value and a standard deviation of each set of pixel data are calculated. The small plus-sign symbols of FIG. 6 represent samples of the calculated standard deviations according to the twenty four color patches.

Referring to FIG. 6, the standard deviation of the shot noise may be set as a linear function depending on the pixel data. The straight line of FIG. 6 represents the linear function and the linear function may be obtained by fitting the straight line to the samples of the standard deviations, for example, through least square regression. The arbitrary point Q2 on the straight line represents the standard deviation of the shot noise depending on the pixel data L.

As such, the shot noise model may correspond to the standard deviation SS of the shot noise and the standard deviation SS of the shot noise may be set as the linear function SS(L) depending on the pixel data L as shown in Expression 2.

$$SS(L)=c3*L+c4 \qquad \text{Expression 2}$$

As a result, the shot noise model may be set by obtaining the coefficients c3 and c4 in Expression 2. The shot noise may be varied depending on a gain or a sensitivity of the image sensor, and thus the coefficients c3 and c4 may be set with respect to each gain of the image sensor. Furthermore, the shot noise may be varied depending on a color of the Bayer domain, and thus the coefficients c3 and c4 may be set with respect to each color of the Bayer domain. For example, if the pattern and the color kernel are similar to those as illustrated in FIG. 12, four different sets of coefficients c3 and c4 may be set according to four colors R, Gr, B and Gb, respectively.

Figure 7:
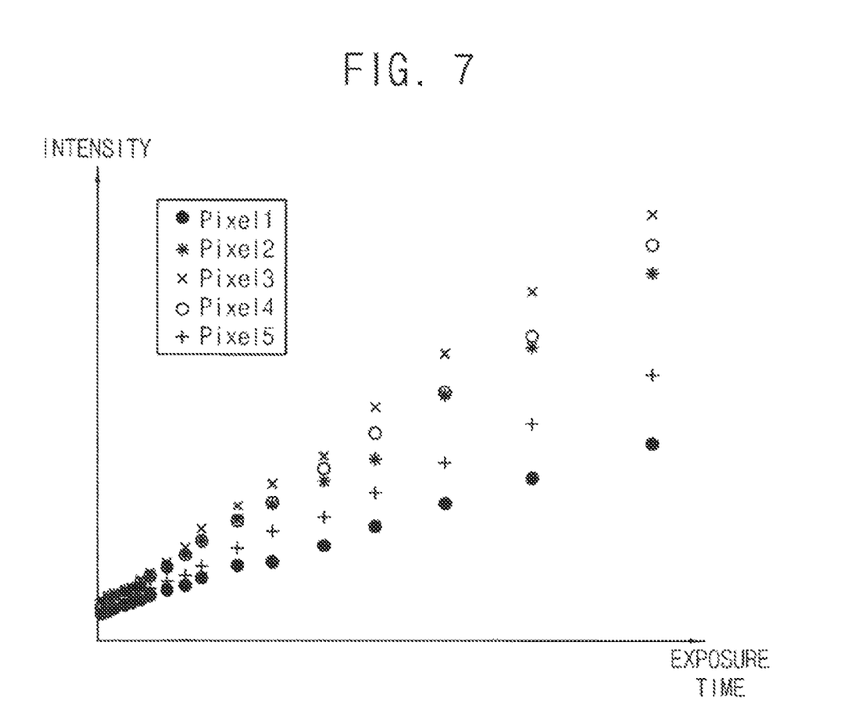
FIG. 7 is a diagram illustrating a response characteristic of pixels in an image sensor.
Figure 8:
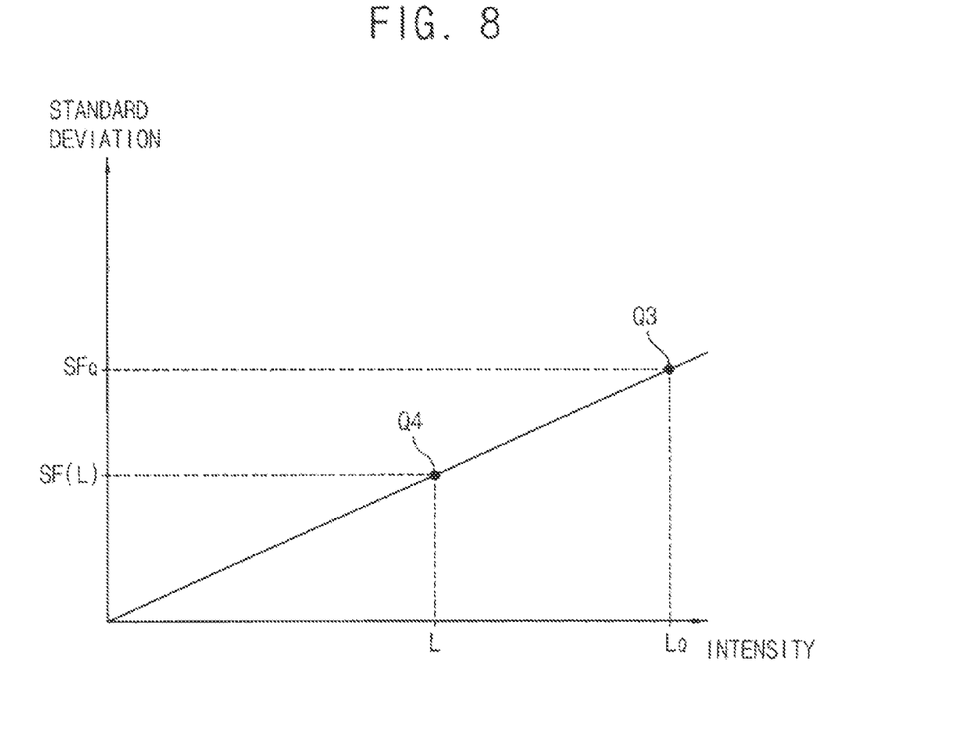
FIG. 8 is a diagram illustrating an example of a fixed-pattern noise model for integrated noise modeling according to an example embodiment.

FIG. 7 is a diagram illustrating a response characteristic of pixels in an image sensor, and FIG. 8 is a diagram illustrating an example of a fixed-pattern noise model for integrated noise modeling according to an example embodiment.

The fixed-pattern noise in the captured image is results from pixels in an image sensor having response characteristics which are different from each other. The fixed-pattern noise may be critical compared with other noise types in the case of images having higher brightness. In accordance with Expression 3 proposed by the international standard ISO 15739, the standard deviation $\sigma_{fp}$ corresponding to a brightness of an image may be obtained by averaging a sequence of "n" images to reduce random noise.

$$\sigma_{fp} = \sqrt{\sigma_{ave}^2 - \frac{1}{n-1}\sigma_{diff}^2} \qquad \text{Expression 3}$$

In Expression 3, $\sigma^2_{ave}$ indicates a variance of an average image that is computed by averaging the image sequence, and $\sigma^2_{diff}$ indicates an average value of variances that are computed from the difference images between the average image and each image of the image sequence. As mentioned above, the fixed-pattern noise is caused by different responses of the pixels, and FIG. 7 illustrates response characteristics of an arbitrary five pixels Pixel1 to Pixel5 according to the exposure time of the image sensor. As shown in FIG. 7, the pixels typically have a linear response with respect to the exposure time. In an embodiment, to set the fixed-pattern noise model, one point Q3 as illustrated in FIG. 8 may be obtained by calculating a standard deviation $SF_Q$ with respect to a specific intensity or brightness $L_Q$ using Expression 3 of the international standard ISO 15739. A linear function of the fixed-pattern noise model depending on the pixel data L may be represented by the straight line of FIG. 8 connecting the origin point and the obtained point Q3. The arbitrary point Q4 on the straight line represents the standard deviation of the fixed-pattern noise according to the pixel data L.

As such, the fixed-pattern noise model may correspond to the standard deviation SF of the fixed-pattern noise and the standard deviation SF of the fixed-pattern noise may be set as the linear function SF(L) depending on the pixel data L as shown in Expression 4.

$$SF(L)=c5*L \qquad \text{Expression 4}$$

As a result, the fixed-pattern noise model may be set by obtaining the coefficients c5 in Expression 4. The fixed-pattern noise may be varied depending on a gain or a sensitivity of the image sensor, and thus the coefficients c5 may be set with respect to each gain of the image sensor. Furthermore, the fixed-pattern noise may be varied depending on a color of the Bayer domain, and thus the coefficients c5 may be set with respect to each color of the Bayer domain. For example, if the pattern and the color kernel are similar to those as illustrated in FIG. 12, four different coefficients c5 may be set according to four colors R, Gr, B and Gb, respectively.

As described with reference to FIGS. 3 to 8, the dark-current noise model, the shot noise model and fixed-pattern noise model may be set as the respective linear functions. In other embodiments, the noise models may be set as other functions which are not linear functions, according to the characteristics of the image sensor capturing the image. In case that the noise models are set as the linear functions, calculation for noise filtering becomes simple, thereby reducing a circuit configuration so to be more readily adaptable to a portable device such as a digital camera, camera phone, and so on.

Once the plurality of noise models are set, the integrated noise level SINT is determined based on the plurality of noise models.

For example, the integrated noise level SINT may be determined based on the dark-current noise model when the pixel data L to be processed is smaller than the dark-current bias Dbias as described in FIG. 4, and the integrated noise level SINT may be determined based on the shot noise model and the fixed-pattern noise model when the pixel data L to be processed is equal to or greater than the dark-current bias Dbias.

In an example embodiment, the integrated noise level SINT reflecting the dark-current noise model, the shot noise model and the fixed-pattern noise model may be determined as Expression 5.

If $L < D\text{bias}$, $SINT(L,T) = S1 = SD(T)$

If $L \geq D\text{bias}$, $SINT(L,T) = S2 = [SS(L)^2 + SF(L)^2]^{1/2}$  Expression 5

As shown in Expression 4, when the pixel data L in the Bayer domain is smaller than the dark-current bias Dbias, only the standard deviation SD of the dark-current noise may contribute to the integrated noise level. In contrast, when the pixel data L in the Bayer domain is equal to or greater than the dark-current bias Dbias, the variance $SINT^2$ may be set as the sum of the variance $SS^2$ of the shot-noise and the variance $SF^2$ of the fixed-pattern noise, and the dark-current noise is omitted since the shot noise includes the dark-current noise when the intensity or the respective pixel data is relatively high.

As such, in the method of modeling the integrated noise model, the noise modeling is performed based on the Bayer domain signal BS, and thus noise in the image may be effectually reduced. Furthermore, the integrated noise model reflects the dark-current noise, the shot noise and the fixed-pattern noise, and thus precise noise processing or filtering may be performed in a wide range from a lower brightness image to a higher brightness image.

Figure 9A:
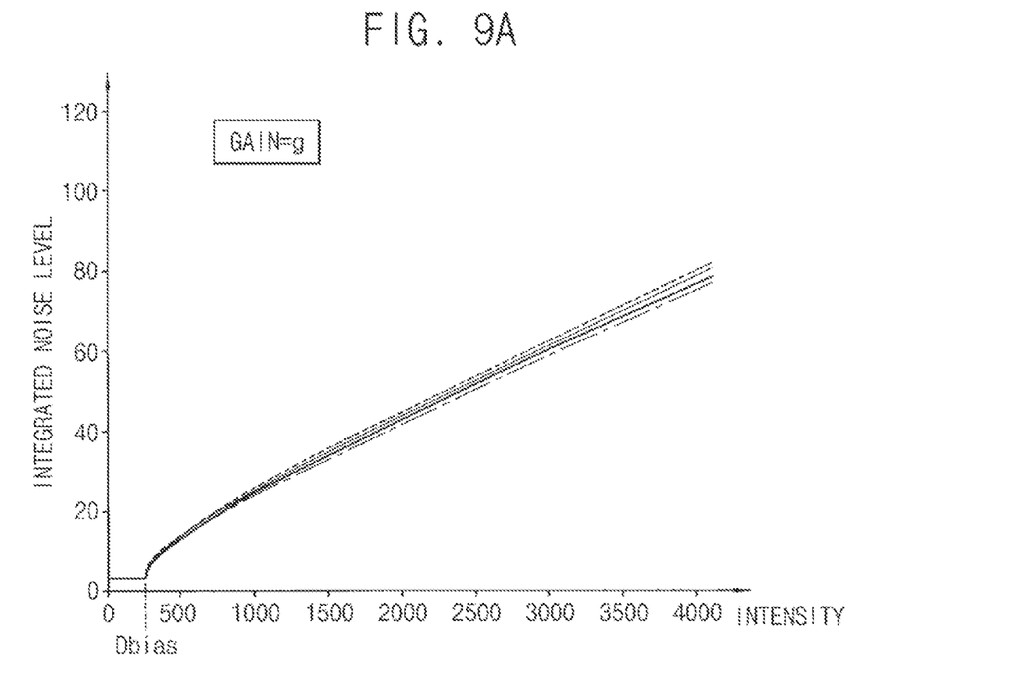
FIGS. 9A, 9B and 9C are diagrams illustrating an integrated noise level depending on a gain of an image sensor.
Figure 9B:
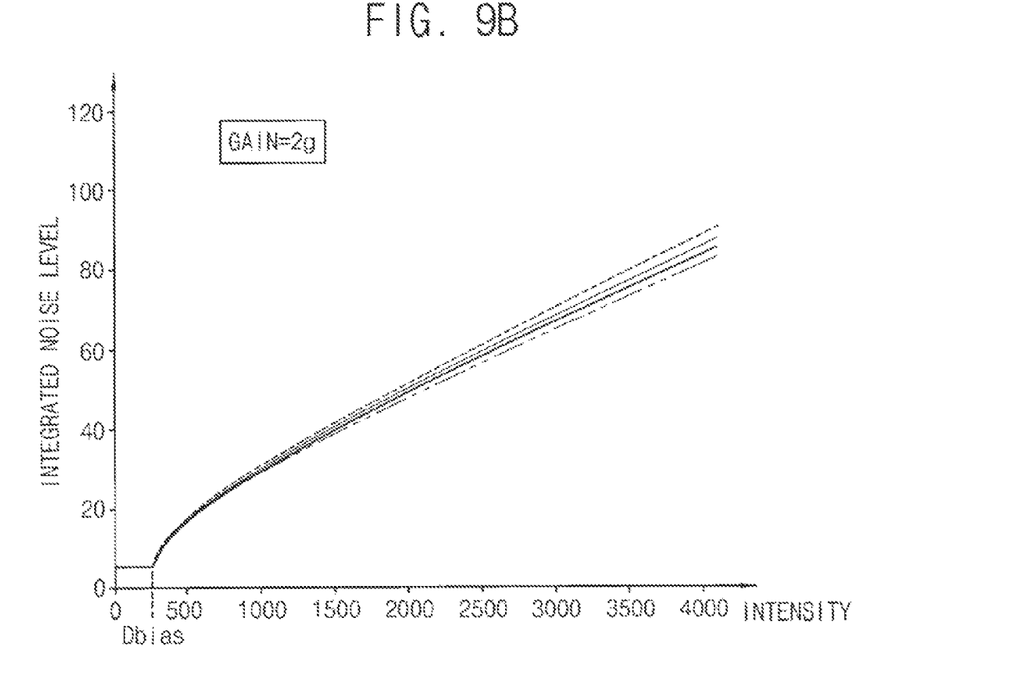
Figure 9C:
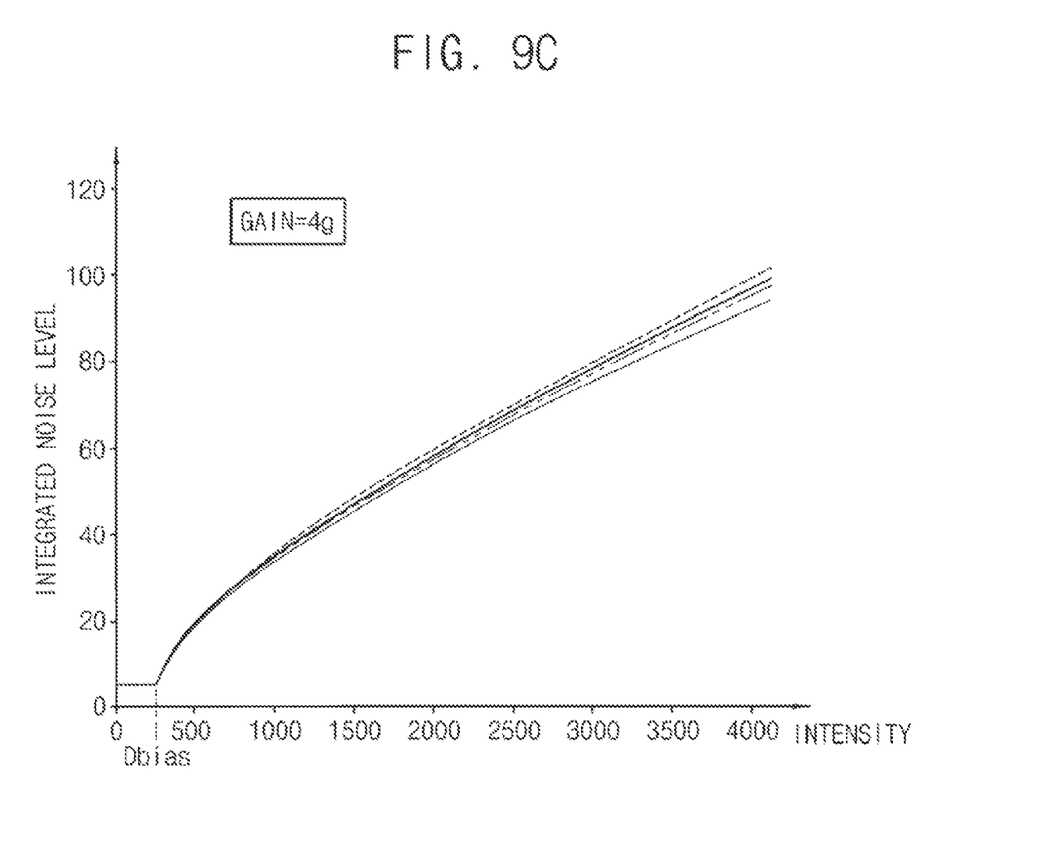

FIGS. 9A, 9B and 9C are diagrams illustrating an integrated noise level relative to a gain of an image sensor.

The integrated noise level SINT according to the colors of the Bayer domain are illustrated, with respect to the gain of "g" in FIG. 9A, with respect to the gain of "2g" in FIG. 9B, and with respect to the gain of "4g" in FIG. 9C. The four curves in each figure correspond to the four colors R, Gr, B and Gb of the Bayer domain, respectively. The intensity of the horizontal axis denotes a digital value of the pixel data L to be processed, and the vertical axis denotes the integrated noise level SINT, that is the standard deviation of the integrated noise model. As described above, when the pixel data L in the Bayer domain is smaller than the dark-current bias Dbias, the integrated noise level SINT is constant regardless of the pixel data L. In this case, the integrated noise level SINT may depend on the exposure time T of the image sensor as described with reference to FIG. 3 and Expression 5. When the pixel data L in the Bayer domain is greater than the dark-current bias Dbias, the integrated noise level SINT is substantially independent of camera setting values such as the exposure time, but depends on the gain of the image sensor included in the camera. Accordingly, the several integrated noise models according to possible gains of the image sensor may be stored in the lookup table and the stored integrated model need not to be upgraded according to input images.

Figure 10:
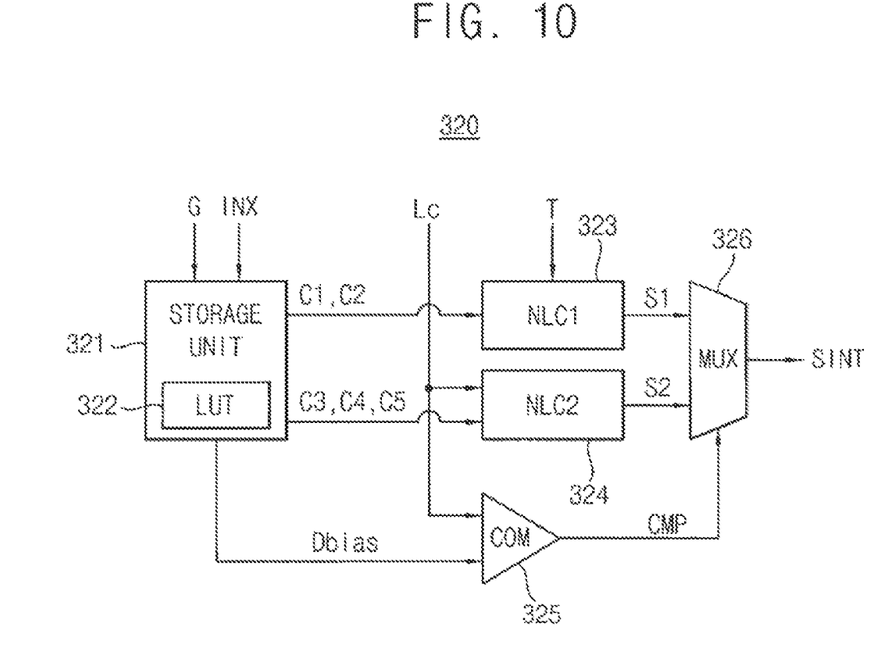
FIG. 10 is a block diagram illustrating an example of a modeling unit in the image capturing device of FIG. 1.

FIG. 10 is a block diagram illustrating an example of a modeling unit in the image capturing device of FIG. 1.

Referring to FIG. 10, a modeling unit 320 of this example includes a storage unit 321, a first noise level calculator (NLC1) 323, a second noise level calculator (NLC2) 324, a comparator (COM) 325 and a selection unit (MUX) 326.

The storage unit 321 includes a lookup table (LUT) 322 that stores values representing a plurality of noise models, and circuits (not shown) for inputting and outputting the values. For example, the values stored in the lookup table 322 may be the coefficients c1, c2, c3, c4 and c5 in Expressions 1, 2 and 4. The storage unit 321 receives a gain G of the image sensor and a color index INX of the pixel data Lc to be processed and outputs the coefficients c1, c2, c3, c4 and c5 corresponding to the gain G and the color index INX. The first noise level calculator 323 receives an exposure time T and the coefficients c1 and c2 of the dark-current noise model to calculate and output a first noise level S1. The second noise level calculator 324 receives the pixel data Lc to be processed and the coefficients c3, c4 and c5 of the shot noise model and the fixed-pattern noise model to calculate and output a second noise level S2. For example, the first noise level calculator 323 and the second noise level calculator 324 may calculate the first noise level S1 and the second noise level S2 according to Expression 5. The comparator 325 compares the pixel data Lc and the dark-current bias Dbias to output a comparison signal CMP. The comparison signal CMP may be a first logic level (e.g., logic low level) when the pixel data Lc is smaller than the dark-current bias Dbias, and a second logic level (e.g., logic high level) when the pixel data Lc is equal to or greater than the dark-current bias Dbias. The selection unit 326 selects and outputs one of the first noise level S1 and the second noise level S2 in response to the comparison signal CMP. Using such circuit configuration as illustrated in FIG. 10, the integrated noise level SINT may be determined based on the dark-current noise model when the pixel data Lc to be processed is smaller than the dark-current bias Dbias, whereas the integrated noise level SINT may be determined based on the shot noise model and the fixed-pattern noise model when the pixel data Lc to be processed is equal to or greater than the dark-current bias Dbias.

Figure 11:
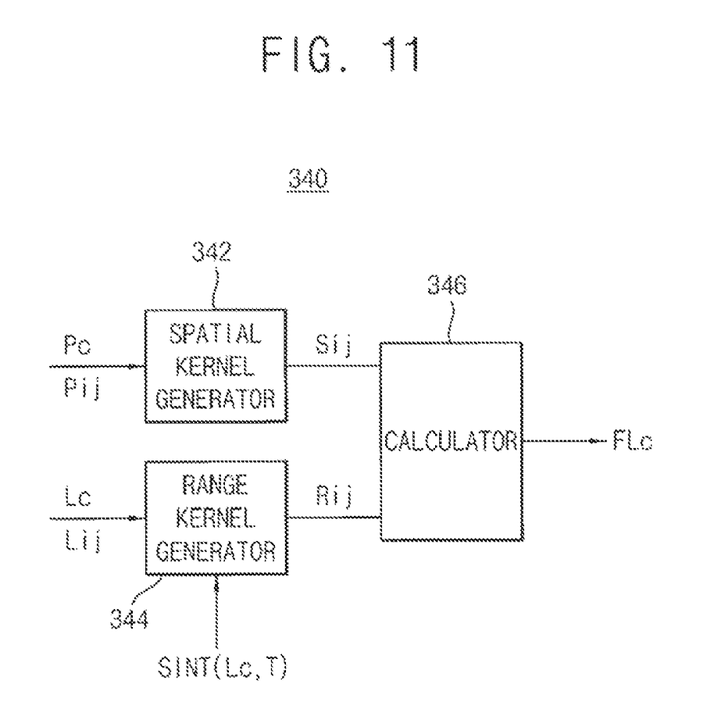
FIG. 11 is a block diagram illustrating an example of a noise filter in the image capturing device of FIG. 1.

FIG. 11 is a block diagram illustrating an example of a noise filter in the image capturing device of FIG. 1.

Referring to FIG. 11, a noise filter 340 of this example includes a spatial kernel generator 342, a range kernel generator 344 and a calculator 346.

The spatial kernel generator 342 calculates and outputs a first weight value Sij indicating a spatial correlation between pixels, based on a position Pc of the pixel data to be processed and a position Pij of the neighboring pixel data. For example, the first weight value Sij may be calculated using a Gaussian function having a standard deviation SR as in Expression 6.

$$Sij = \exp\left\{-\frac{1}{2}\left(\frac{|Pc - Pij|}{SR}\right)^2\right\}$$  Expression 6

The deviation SR in Expression 6 may be determined according to the number of neighboring pixels used in the filtering and the extent of the noise.

The range kernel generator 344 calculates and outputs a second weight value Rij indicating a correlation between pixel data, based on the pixel data Lc to be processed and the neighboring pixel data Lij. The second weight value Rij is for reflecting the difference between the pixel data according to the noise level. Accordingly, the second weight value Rij may be used to effectually preserve edges in the image in addition to reducing noise. For example, the second weight value Rij may be calculated using the integrated noise level SINT according to example embodiments as in Expression 7.

$$Rij = \exp\left\{-\frac{1}{2}\left(\frac{|Lc - Lij|}{SINT(Lc, T)}\right)^2\right\}$$ Expression 7

The calculator 326 performs noise filtering or noise processing based on the first weight value Sij and the second weight value Rij and outputs a filtered pixel data FLc. For example, the calculator 326 may perform bilateral filtering based on the pixel position and the pixel data as in Expression 8.

$$FLc = \frac{\sum_{i,j} Sij(Pc)Rij(Lc, SINT)Lij}{\sum_{i,j} Sij(Pc)Rij(Lc, SINT)}$$ Expression 8

As described above, the integrated noise level SINT may be a function of pixel data Lc and the exposure time T, and thus precise filtering may be performed by applying the noise level depending on the pixel data Lc.

FIG. 12 is a diagram illustrating an example of a filter kernel for reducing noise in an image sensor.

The image sensor 100 of FIG. 1 may include a pixel array (not shown) in which red pixels R, blue pixels B and green pixels Gr and Gb in a Bayer pattern as illustrated in FIG. 12, and circuits (not shown) for outputting the Bayer domain signal BS. The Bayer domain signal BS may be output by the unit of a row or by the unit of a frame depending on the configuration of the image sensor 100. As mentioned above, noise filtering of the frame data in the Bayer domain may be performed with respect to each color of the Bayer domain. In this case, neighboring pixels (Pij, Lij) used in the calculation of Expression 8 may pertain to the same color as the pixel (Pc, Lc) to be processed. In other words, the respective kernels 410, 420, 430 and 440 may be formed for noise filtering per color as illustrated in FIG. 12. For example, the green kernel 410 may be formed including a center pixel 411 corresponding to the pixel to be processed currently and other neighboring pixels. Even though the kernels of a 3*3 size are illustrated in FIG. 12, the size of the kernel may be varied according to embodiments. The integrated noise level SINT may be set with respect to each color of the Bayer domain for such noise filtering per color.

In the calculation of Expression 8, the neighboring pixel (Pij, Lij) may include the center pixel (Pc, Lc) to be processed. Alternatively, the neighboring pixel (Pij, Lij) may exclude the center pixel (Pc, Lc) to be processed to prevent an impulse noise.

As mentioned above, according to embodiments of the inventive concepts, in methods of modeling the integrated noise model and in methods of reducing noise using an integrated noise modeling, the noise modeling is performed based on the Bayer domain signal BS and the integrated noise model reflects the dark-current noise, the shot noise and the fixed-pattern noise. Accordingly noise in the image may be effectually reduced in a wide range from a lower brightness image to a higher brightness image.

Furthermore, the obtained integrated noise model may not be upgraded according to the respective images. The values representing the noise model may be stored in a memory device of a small capacity as a form of a lookup table. The amount of calculation for noise filtering may be reduced using the stored values.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of processing a Bayer domain signal of an image signal to model an integrated noise in the image sensor, the method comprising:
    receiving the Bayer domain signal of the image signal;
    setting a plurality of noise models using the Bayer domain signal, the noise models including a dark-current noise model, a shot noise model and a fixed-pattern noise model; and
    determining an integrated noise level in the image sensor based on the plurality of noise models.

2. The method of claim 1, wherein the integrated noise level depends on an exposure time of the image sensor and a pixel data to be processed, the pixel data being provided from the image sensor in a Bayer domain.

3. The method of claim 1, wherein at least one of the dark-current noise model, the shot noise model and the fixed-pattern noise model is set with respect to each color of Bayer domain.

4. The method of claim 1, wherein at least one of the dark-current noise model, the shot noise model and the fixed-pattern noise model is set with respect to each gain of the image sensor.

5. The method of claim 1, wherein the dark-current noise model corresponds to a standard deviation of a dark-current noise and the standard deviation of the dark-current noise is set as a linear function depending on an exposure time of the image sensor.

6. The method of claim 1, wherein the shot noise model corresponds to a standard deviation of a shot noise and the standard deviation of the shot noise is set as a linear function depending on a pixel data to be processed.

7. The method of claim 1, wherein the fixed-pattern noise model corresponds to a standard deviation of a fixed-pattern noise and the standard deviation of the fixed-pattern noise is set as a linear function depending on a pixel data to be processed.

8. The method of claim 1, further comprising setting a dark-current bias using the Bayer domain signal provided from the image sensor, the dark-current bias corresponding to an average value of a dark-current noise.

9. The method of claim 8, wherein the integrated noise level is determined based on the dark-current noise model when a pixel data to be processed is smaller than the dark-current bias, and the integrated noise level is determined based on the shot noise model and the fixed-pattern noise model when the pixel data to be processed is equal to or greater than the dark-current bias.

10. The method of claim 8, wherein the integrated noise level is determined as SINT(L,T)=SD(T) when a pixel data to be processed is smaller than the dark-current bias and the integrated noise level is determined as SINT(L,T)=[SS(L)$^2$+SF(L)$^2$]$^{1/2}$ when the pixel data to be processed is equal to or greater than the dark-current bias, where L is the pixel data to be processed, T is an exposure time of the image sensor, SINT is the integrated noise level, SD is a standard deviation of a dark-current noise, SS is a standard deviation of a shot noise and SF is a standard deviation of a fixed-pattern noise.

11. A method of reducing noise in an image sensor, the method comprising:
setting a plurality of noise models using a Bayer domain signal provided from the image sensor, the noise models including a dark-current noise model, a shot noise model and a fixed-pattern noise model;
determining an integrated noise level based on the plurality of noise models; and
filtering frame data based on the integrated noise level, the frame data including a plurality of pixel data provided from the image sensor in a Bayer domain.

12. The method of claim 11, wherein the dark-current noise model corresponds to a standard deviation of a dark-current noise and the standard deviation of the dark-current noise is set as a linear function depending on an exposure time of the image sensor,
wherein the shot noise model corresponds to a standard deviation of a shot noise and the standard deviation of the shot noise is set as a linear function depending on the pixel data to be processed, and
wherein the fixed-pattern noise model corresponds to a standard deviation of a fixed-pattern noise and the standard deviation of the fixed-pattern noise is set as a linear function depending on the pixel data to be processed.

13. The method of claim 11, wherein setting the plurality of noise models includes:
setting each of the noise models as respective functions; and
storing coefficients of the functions as a lookup table in a storage device of the image sensor, the coefficients being set with respect to each color of Bayer domain and each gain of the image sensor.

14. The method of claim 13, wherein determining the integrated noise level includes:
extracting the coefficients from the lookup table, the extracted coefficients corresponding to the gain of the image sensor and the color of the pixel data to be processed; and calculating the integrated noise level based on an exposure time of the image sensor, the pixel data to be processed and the extracted coefficients.

15. The method of claim 11, further comprising setting a dark-current bias using the Bayer domain signal provided from the image sensor, the dark-current bias corresponding to an average value of a dark-current noise.

16. The method of claim 15, wherein the integrated noise level is determined based on the dark-current noise model when the pixel data to be processed is smaller than the dark-current bias, and the integrated noise level is determined based on the shot noise model and the fixed-pattern noise model when the pixel data to be processed is equal to or greater than the dark-current bias.

17. The method of claim 15, wherein the integrated noise level is determined as SINT(L,T)=SD(T) when the pixel data to be processed is smaller than the dark-current bias and the integrated noise level is determined as SINT(L,T)=[SS(L)$^2$+SF(L)$^2$]$^{1/2}$ when the pixel data to be processed is equal to or greater than the dark-current bias, where L is the pixel data to be processed, T is an exposure time of the image sensor, SINT is the integrated noise level, SD is a standard deviation of a dark-current noise, SS is a standard deviation of a shot noise and SF is a standard deviation of a fixed-pattern noise.

18. The method of claim 11, wherein filtering the frame data is performed based on the following equation, $$FLc = \frac{\sum_{i,j} Sij(Pc)Rij(Lc, SINT)Lij}{\sum_{i,j} Sij(Pc)Rij(Lc, SINT)},$$

where SINT is the integrated noise level, Lc is the pixel data to be processed, Pc is a position of the pixel data to be processed, FLc is a filtered pixel data, Lij is each neighboring pixel data, Sij is a first weight function depending on the position of the pixel data to be processed and a position of each neighboring pixel data, and Rij is a second weight function depending on the pixel data to be processed and each neighboring pixel data.

19. The method of claim 18, wherein the second weight function is calculated based on the following equation, $$Rij = \exp\left\{-\frac{1}{2}\left(\frac{|Lc - Lij|}{SINT(Lc, T)}\right)^2\right\},$$

where T is an exposure time of the image sensor.

20. The method of claim 18, wherein filtering the frame data is performed with respect to each color of Bayer domain, and each neighboring pixel data pertains to the same color as the pixel data to be processed.

* * * * *